UNITED STATES PATENT OFFICE.

JAMES H. STEBBINS, JR., OF NEW YORK, N. Y.

IMPROVEMENT IN COLORING-MATTERS OBTAINED FROM NAPHTHYLAMINE AND DIAZO-BENZOLE NITRATE.

Specification forming part of Letters Patent No. 221,119, dated October 28, 1879; application filed April 23, 1879.

*To all whom it may concern:*

Be it known that I, JAMES H. STEBBINS, Jr., of the city, county, and State of New York, have invented a new and useful Improvement in Coloring-Matters, which improvement is fully set forth in the following specification.

This invention relates to a ruby-red coloring-matter which is obtained by the reaction of naphthylamine and diazo-benzole nitrate, and which I call "naphthylamidine."

In carrying out my invention I prepare a solution of naphthylamine in alcohol, and also a solution of diazo-benzole nitrate in water, using about equal molecules of naphthylamine and of diazo-benzole nitrate. These two solutions are then poured together, and to the mixture is added a quantity of strong hydrochloric acid while a gentle heat is applied. Instantly the liquid turns into a rich crimson color, which crystallizes into a mass of brown crystals. These crystals form my new coloring-matter, which dissolves readily in cold and very easily in warm alcohol. It is insoluble in water. By converting this coloring-matter into a potash-salt it becomes sparingly soluble in water, but very soluble in alcohol.

My new coloring-matter dissolves easily in glacial acetic acid, and silk dipped into this solution is dyed with a dark-brown color. Cotton dyed with the above-named acid solution assumes a crimson color, and wool a fine red.

What I claim as new, and desire to secure by Letters Patent, is—

As a new manufacture, the coloring-matter or dye-stuff produced by the reaction of naphthylamine and diazo-benzole nitrate, substantially in the manner described, or by any other method which will produce a like result.

In testimony that I claim the foregoing I have hereunto set my hand and seal this 19th day of April, 1879.

JAMES H. STEBBINS, JR. [L. S.]

Witnesses:
W. HAUFF,
E. F. KASTENHUBER.